US010112212B1

(12) United States Patent
Stearns et al.

(10) Patent No.: US 10,112,212 B1
(45) Date of Patent: Oct. 30, 2018

(54) DROPLET EJECTION USING FOCUSED ACOUSTIC RADIATION HAVING A PLURALITY OF FREQUENCY RANGES

(75) Inventors: Richard G. Stearns, Felton, CA (US); Mitchell W. Mutz, Palo Alto, CA (US); Richard N. Ellson, Palo Alto, CA (US)

(73) Assignee: Labcyte Inc., Sunnyvale, CA (US)

( * ) Notice: Subject to any disclaimer, the term of this patent is extended or adjusted under 35 U.S.C. 154(b) by 0 days.

(21) Appl. No.: 10/821,311

(22) Filed: Apr. 8, 2004

(51) Int. Cl.

| | |
|---|---|
| ***B05D 1/02*** | (2006.01) |
| ***B05D 5/00*** | (2006.01) |
| ***B05D 7/00*** | (2006.01) |
| ***B28B 19/00*** | (2006.01) |
| ***B29B 15/10*** | (2006.01) |
| ***C23C 18/00*** | (2006.01) |
| ***C23C 20/00*** | (2006.01) |
| ***C23C 28/00*** | (2006.01) |

(52) U.S. Cl.
CPC ................. *B05D 1/02* (2013.01); *B05D 5/00* (2013.01)

(58) Field of Classification Search
CPC ....... B05D 1/02; B82Y 10/00; H01L 21/6715; H01L 51/0005; H05K 3/1241
USPC .................................. 427/565, 600; 222/196
See application file for complete search history.

(56) References Cited

U.S. PATENT DOCUMENTS

| | | | | |
|---|---|---|---|---|
| 4,308,547 | A | 12/1981 | Lovelady | |
| 5,122,818 | A | 6/1992 | Elrod et al. | |
| 5,520,715 | A * | 5/1996 | Oeftering | 75/335 |
| 6,350,494 | B1 * | 2/2002 | Farnworth | 427/469 |
| 6,416,164 | B1 | 7/2002 | Stearns et al. | |
| 6,596,239 | B2 | 7/2003 | Williams et al. | |
| 6,666,541 | B2 | 12/2003 | Ellson | |
| 2004/0056931 | A1 * | 3/2004 | Hadimioglu et al. | 347/75 |

OTHER PUBLICATIONS

Elrod, et al., "Nozzleless droplet formation with focused acoustic beams," J. Appl. Physics (1989) 65:(9) 3441-3447.
Krause, K.A., "Focusing Ink Jet Head," IBM Technical Disclosure Bulletin (1973) 16:(4) 1168.

* cited by examiner

*Primary Examiner* — Michael P Wieczorek
*Assistant Examiner* — Michael G Miller
(74) *Attorney, Agent, or Firm* — Kilpatrick Townsend & Stockton LLP

(57) ABSTRACT

Devices and methods are provided for ejecting a droplet from a reservoir using focused acoustic radiation having a plurality of nonsimultaneous and discrete frequency ranges. Such frequency ranges may be used to control droplet volume and/or velocity. Optionally, satellite fluid ejection from the reservoir is suppressed.

81 Claims, 7 Drawing Sheets

DROPLET EJECTION USING FOCUSED ACOUSTIC RADIATION HAVING A PLURALITY OF FREQUENCY RANGES

TECHNICAL FIELD

The invention relates generally to the ejection of a fluid droplet using focused acoustic radiation of previously unknown forms, e.g., focused acoustic radiation having a plurality of nonsimultaneous and discrete frequency ranges. In particular, the invention relates to the use of such frequency ranges to control, e.g., increase drop ejection rate, droplet volume and/or velocity. Optionally, satellite fluid ejection from the reservoir is suppressed

BACKGROUND

There is an ongoing need in the art to improve high-speed methods and apparatuses to address the general need in the art for systematic, efficient, and economical material synthesis techniques as well as methods to analyze and to screen novel materials for useful properties. High-speed combinatorial methods often involve the use of array technologies that require rapid and accurate dispensing of fluids each having a precisely known chemical composition, concentration, stoichiometry, ratio of reagents, and/or volume. Such array technologies may be employed to carry out various synthetic processes and evaluations, particularly those that involve small quantities of fluids. For example, array technologies may employ large numbers of different fluids to form a plurality of reservoirs that, when arranged appropriately, create combinatorial libraries. Thus, array technologies are desirable because they are commonly associated with speed and compactness.

To carry out combinatorial techniques, a number of fluid dispensing techniques have been explored, such as pin spotting, pipetting, inkjet printing, and acoustic ejection. Many of these techniques possess inherent drawbacks that must be addressed, however, before the fluid dispensing accuracy required for the combinatorial methods can be achieved. For instance, a number of fluid dispensing systems are constructed using networks of tubing or other fluid-transporting vessels. Tubing, in particular, can entrap air bubbles, and nozzles may become clogged by lodged particulates. As a result, system failure may occur and cause spurious results. Furthermore, cross-contamination between the reservoirs of compound libraries may occur due to inadequate flushing of tubing and pipette tips between fluid transfer events. Cross-contamination can easily lead to inaccurate and misleading results.

Acoustic ejection provides a number of advantages over other fluid dispensing technologies. In contrast to inkjet devices, nozzleless fluid ejection devices are not subject to clogging and their associated disadvantages, e.g., misdirected fluid or improperly sized droplets. Furthermore, acoustic technology does not require the use of tubing or involve invasive mechanical actions, for example, those associated with the introduction of a pipette tip into a reservoir of fluid.

Acoustic ejection has been described in a number of patents. For example, U.S. Pat. No. 4,308,547 to Lovelady et al. describes a liquid droplet emitter that utilizes acoustic principles to eject droplets from a body of liquid onto a moving document to result in the formation of characters or barcodes thereon. A nozzleless inkjet printing apparatus is used such that controlled droplets of ink are propelled by an acoustical force produced by a curved transducer at or below the surface of the ink. Similarly, U.S. Pat. No. 6,666,541 to Ellson et al. describes a device for acoustically ejecting a plurality of fluid droplets toward discrete sites on a substrate surface for deposition thereon. The device includes an acoustic radiation generator that may be used to eject fluid droplets from a reservoir. Acoustic radiation may also be used to assess properties and spatial relationship associated with the fluid contained in the reservoir. Additional patents and patent documents that describe the use of acoustic radiation for ejection include U.S. Pat. No. 6,596,239 to Williams et al.

In general, nozzleless fluid ejection has been limited to ink printing applications. For example, U.S. Pat. No. 5,122,818 to Elrod et al. describes the use of acoustic radiation having simultaneous, broadband, and/or random frequency components to reduce focusing sensitivity in acoustic ink printers. In addition, droplet ejection involving the use of focused acoustic radiation has relied almost exclusively on lenses having F-numbers of approximately 1. Lenses having an F-number of 1 or less are limited to certain reservoir and fluid level geometries. For example, when lenses having an F-number of 1 are used, the surface of the fluid from which a droplet is ejected must be no further from the lens than the width of the lens aperture. In contrast, fluids for use in chemical, biochemical, bimolecular applications are often contained in individual wells of a well plate, wherein the wells each have aspect ratios of approximately 5:1. That is, the wells may be five times as deep as their diameter. Therefore, when an F1 lens is used in conjunction with a 5:1 aspect ratio well, acoustic ejection may be carried out by filling only the bottom fifth of the reservoir with fluid. Furthermore, lenses having low F-numbers provide relatively limited depth of focus. As a result, there is a greater sensitivity to the fluid level in the reservoir when using lower F-number lenses.

Nevertheless, a few of patents and publications have discussed droplet ejection using acoustic lenses having an F-number of 2 or greater. For example, Elrod et al. (1989), "Nozzleless droplet formation with focused acoustic beams," J. Appl. Phys 65(9):3441-3447, teaches away from the use of acoustic lens having an F-number of 2 or greater by indicating that use of such lenses may yield unpredictable results in terms of droplet diameter and usable depth of focus. U.S. Pat. No. 6,416,164 to Stearns et al., however, teaches that lenses having a large F-number, e.g., F2 or greater, provides greater control over droplet size and velocity while enhancing depth of focus.

An increase in droplet ejection volume and/or velocity is generally associated with an increase in the power associated with the applied acoustic radiation. In some instances, an increased velocity is needed to ensure that the ejected droplet reaches an intended target. It has been observed, however, that an excessively high power level will tend to result in the ejection of secondary or "satellite" droplets. In addition, those secondary or satellite droplets formed using higher F-number lenses have properties that differ from those formed using a lower F-number lens.

In general, secondary or satellite droplet formation in the context of acoustic ejection is undesirable for a number of reasons. For example, when both primary and secondary droplets are formed by an upward application of focused acoustic radiation to a reservoir of fluid, the primary droplet may have sufficient velocity to reach a target whereas the secondary droplet may not. In such a circumstance, it may be necessary wait for the secondary droplet to return to the reservoir before ejecting a subsequent droplet. Otherwise, the secondary droplet may obstruct the trajectory of the subsequent droplet. In turn, droplet ejection rate is limited. Alternatively, a means may be needed to ensure that the secondary droplet does not obstruct the trajectory of the subsequently ejected droplet. However, this approach introduces additional complexity into any equipment used to carry out acoustic ejection.

Thus, there is a need in the art for improved methods and devices that are capable of carrying out nozzleless ejection using high-powered focused acoustic radiation without uncontrolled formation of satellite or secondary droplets.

SUMMARY OF THE INVENTION

Accordingly, it is an object of the present invention to overcome the above-mentioned disadvantages of the prior art by providing improved devices and methods for ejecting one or more droplets from a reservoir of fluid, through the use previously unknown forms of focused acoustic radiation, optionally those forms having a plurality of nonsimultaneous and discrete frequency ranges.

Additional objects, advantages and novel features of the invention will be set forth in part in the description that follows, and in part will become apparent to those skilled in the art upon examination of the following, or may be learned by routine experimentation during the practice of the invention.

In general, the invention provides a device for ejecting a droplet from a reservoir of fluid. The device includes a reservoir adapted to contain a fluid, an acoustic ejector, and a means for positioning the acoustic ejector in acoustic coupling relationship with the reservoir. The ejector is comprised of an acoustic radiation generator that generates acoustic radiation and a focusing means for focusing the acoustic radiation generated by the acoustic radiation generator in a manner effective to eject a droplet from the reservoir. The acoustic radiation generated has nonsimultaneous and discrete first and second frequency ranges that at least in part determine the volume and/or velocity of the ejected droplet. Typically, the device is formed from a single acoustic ejector having an acoustic radiation generator that employs a single transducer. In addition, an acoustic coupling medium may be interposed between the focusing means and the reservoir.

The frequency ranges may vary according to the desired performance. For example, one frequency range may be an integer multiple of another. In addition, each frequency range may be comprised of a different range of frequencies. Typically, though, at least one frequency range is comprised of an acoustic sweep, e.g., a linear sweep, through the range. In addition, frequency ranges may be alternatingly or repeatedly produced by the acoustic radiation generator. Furthermore, the frequency ranges may be separated by a predetermined period during which no acoustic radiation is produced that substantially determines the volume and/or velocity of the ejected droplet. Often, the frequency ranges, their amplitudes, and their separation period are selected to suppress ejection of satellite fluid from the reservoir. Satellite fluid ejection may be suppressed acoustically via an active recapture mechanism and/or a secondary push mechanism. In addition, it is desirable to inhibit or reduce any resonance associated with the device or its use.

The device is particularly suited for use with a focusing means having an F-number of at least 2. Such focusing means may be used in conjunction with a plurality of reservoirs, e.g., wherein the reservoirs form a source well plate comprising a plurality of source wells. The device is also suited for transferring fluid from a reservoir to a substrate, e.g., transferring fluid from a source well plate to a target well plate.

The invention also provides a method for ejecting a droplet from a reservoir of fluid. The method involves applying focused acoustic radiation to a reservoir containing a fluid in a manner effective to eject a droplet therefrom. The applied focused acoustic radiation has a plurality of nonsimultaneous and discrete frequency ranges, and the ejected droplet has a volume and/or velocity determined in part by each frequency range.

In some instances, the inventive method may be used to increase the volume of the ejected droplet. For example, the ejected droplet ejected may have a volume that is at least 100% greater than the volume of a droplet ejected using the same focused acoustic radiation without one or more of the frequency ranges. In addition, the method may be used to increase the velocity of the ejected droplet. For example, the ejected droplet ejected may have a velocity that is at least 10% higher than the velocity of a droplet ejected using the same focused acoustic radiation but without one or more of the frequency ranges.

The invention can be used to improve efficiency of fluid transfer. For example, a plurality of droplets having substantially the same volume may be ejected in a manner such that all satellite fluid ejection is suppressed. Satellite fluid ejection may be suppressed acoustically to increase droplet ejection rate by at least 10% faster than that possible using the same focused acoustic radiation without one or more frequency ranges. For example, the present inventors have found that by pushing the satellite droplet into the main droplet, the droplet ejection rate may be increased 10 fold from 10 HZ to 100 HZ for certain fluids and drop volumes.

When droplets are to be ejected from a plurality of reservoirs, it is preferable that the reservoirs be preferably acoustically indistinguishable and that each reservoir and fluid contained therein exhibit substantially the same resonance performance relative to any frequency range of the acoustic radiation generated by the acoustic radiation generator. As a quality control measure, fluid in any reservoir may be acoustically interrogated before focused acoustic radiation is applied to eject a droplet therefrom. Results from the acoustic interrogation can be used to compensate for performance of the reservoir in transmitting acoustic radiation for the ejection of a droplet.

In certain embodiments, particularly those involving a secondary push mechanism for suppressing satellite fluid ejection, the invention provides a free fluid surface having a transient unitary feature protruding therefrom and/or a unitary fluid droplet having a transient exterior surface profile. In these embodiments, the surface profile of protruding feature and/or the droplet may be comprised of a plurality of convex lobes, wherein the lobes are separated by at least one concave region.

Thus, the invention also provides for a method in which focused acoustic radiation is applied to a reservoir containing a fluid that has a surface such that a transient feature is formed at the fluid surface. The transient feature has sufficient momentum to form a droplet of a nominal volume and a nominal velocity for ejection from the reservoir. Additional acoustic radiation is then applied to the fluid in a manner effective to modify the momentum of the feature. As a result, a droplet is ejected having an actual volume that differs from the nominal volume and/or an actual velocity that differs from the nominal velocity.

Furthermore, the invention provides for a method for ejecting a droplet from a reservoir of fluid that involves applying focused acoustic radiation in a previously unknown form to a reservoir containing a fluid in a manner effective to eject a droplet therefrom. For example, the applied acoustic radiation applied may not take any single form of acoustic radiation selected from a linear acoustic sweep, dual simultaneous frequencies, broadband frequencies, and random frequencies.

BRIEF DESCRIPTION OF THE DRAWINGS

FIG. 1A illustrates that a lens having a higher F-number may be used to generate a less tightly focused acoustic beam than a lens having a lower F-number. FIG. 1B illustrates that acoustic radiation having a higher frequency may be more tightly focused than acoustic radiation having a lower frequency.

FIG. 2A depicts acoustic radiation having a plurality of nonsimultaneous and discrete repeating frequency ranges in the form of linear acoustic sweeps. FIG. 2B depicts acoustic radiation having a plurality of nonsimultaneous and discrete frequency ranges in the form of multirange linear acoustic sweeps. FIG. 2C depicts acoustic radiation having a plurality of nonsimultaneous and discrete frequency ranges in the form of multirange linear acoustic sweeps separated by a period of silence. FIG. 2D depicts a linear acoustic sweep (also commonly referred to as a linear chirp). FIG. 2E depicts acoustic radiation having dual simultaneous frequencies. FIG. 2F depicts acoustic radiation having broadband frequencies. FIG. 2G depicts acoustic radiation having random frequencies.

FIG. 5A shows the acoustic ejector acoustically coupled to the first reservoir; the ejector is activated in order to eject a droplet of fluid from within the first reservoir toward a site on a substrate surface to form an array. FIG. 5B shows the acoustic ejector acoustically coupled to a second reservoir.

FIG. 6A illustrates a well plate in top view. FIG. 6B illustrates the well plate in cross-sectional view along dotted line A. FIG. 6C illustrates the well plate in bottom view.

DETAILED DESCRIPTION OF THE INVENTION

Figure 1A:
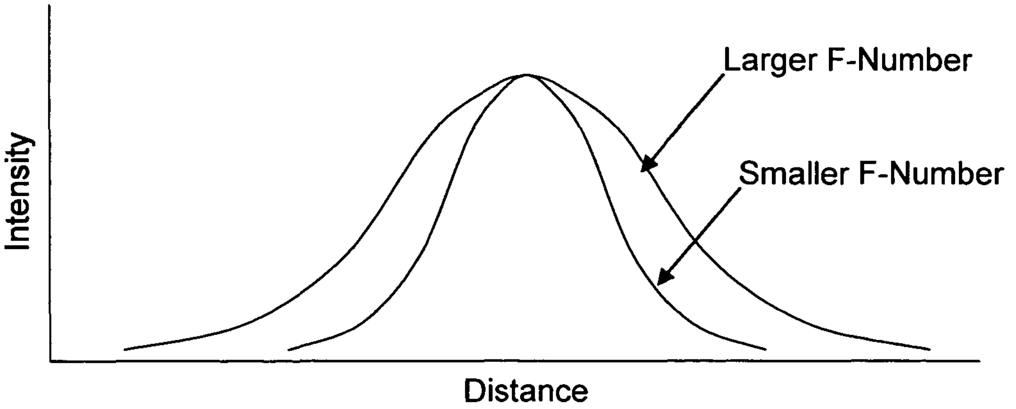
FIGS. 1A and 1B, collectively referred to as FIG. 1, schematically illustrate the effect of F-number and wavelength on acoustic radiation intensity over distance.

Before describing the present invention in detail, it is to be understood that this invention is not limited to specific fluids, frequency ranges, or device structures, as such may vary. It is also to be understood that the terminology used herein is for the purpose of describing particular embodiments only, and is not intended to be limiting.

It must be noted that, as used in this specification and the appended claims, the singular forms “a,” “an,” and “the” include plural referents unless the context clearly dictates otherwise. Thus, for example, reference to “a reservoir” includes a single reservoir as well as a plurality of reservoirs, reference to “a fluid” includes a single fluid and a plurality of fluids, reference to “a frequency range” includes a single frequency range and a plurality of ranges, and reference to “an ejector” includes a single ejector as well as plurality of ejectors and the like.

In describing and claiming the present invention, the following terminology will be used in accordance with the definitions set forth below.

The terms “acoustic coupling” and “acoustically coupled” as used herein refer to a state wherein an object is placed in direct or indirect contact with another object so as to allow acoustic radiation to be transferred between the objects without substantial loss of acoustic energy. When two entities are indirectly acoustically coupled, an “acoustic coupling medium” is needed to provide an intermediary through which acoustic radiation may be transmitted. Thus, an ejector may be acoustically coupled to a fluid, such as by immersing the ejector in the fluid, or by interposing an acoustic coupling medium between the ejector and the fluid, in order to transfer acoustic radiation generated by the ejector through the acoustic coupling medium and into the fluid.

The term “fluid” as used herein refers to matter that is nonsolid, or at least partially gaseous and/or liquid, but not entirely gaseous. A fluid may contain a solid that is minimally, partially, or fully solvated, dispersed, or suspended. Examples of fluids include, without limitation, aqueous liquids (including water per se and salt water) and nonaqueous liquids such as organic solvents and the like. As used herein, the term “fluid” is not synonymous with the term “ink” in that an ink must contain a colorant and may not be gaseous.

The terms “focusing means” and “acoustic focusing means” refer to a means for causing acoustic waves to converge at a focal point, either by a device separate from the acoustic energy source that acts like a lens, or by the spatial arrangement of acoustic energy sources to effect convergence of acoustic energy at a focal point by constructive and destructive interference. A focusing means may be as simple as a solid member having a curved surface, or it may include complex structures such as those found in Fresnel lenses, which employ diffraction in order to direct acoustic radiation. Suitable focusing means also include phased array methods as are known in the art and described, for example, in U.S. Pat. No. 5,798,779 to Nakayasu et al. and Amemiya et al. (1997) *Proceedings of the* 1997 *IS&T NIP*13 *International Conference on Digital Printing Technologies*, pp. 698-702.

“Optional” or “optionally” means that the subsequently described circumstance may or may not occur, so that the description includes instances where the circumstance occurs and instances where it does not.

The term "radiation" is used in its ordinary sense and refers to emission and propagation of energy in the form of a waveform disturbance traveling through a medium such that energy is transferred from one particle of the medium to another without causing any permanent displacement of the medium itself. Thus, radiation may refer, for example, to electromagnetic waveforms as well as acoustic vibrations.

Accordingly, the terms "acoustic radiation" and "acoustic energy" are used interchangeably herein and refer to the emission and propagation of energy in the form of sound waves. As with other waveforms, acoustic radiation may be focused using a focusing means, as discussed below. Although acoustic radiation may have a single frequency and associated wavelength, acoustic radiation may take a form, e.g. a "chirp" or an "acoustic sweep" that includes a plurality of frequencies. The term "characteristic wavelength" is used to describe the mean wavelength of acoustic radiation having a plurality of frequencies.

Similarly, the term "frequency range" as in "acoustic radiation having frequency ranges" refers to continuous sound waves having a plurality of frequencies over a period of time. The term "nonsimultaneous" as in "nonsimultaneous frequency ranges" refers to frequency ranges that do not sound together over their entire duration. For example, two frequency ranges are nonsimultaneous when one sounds for a time period during which the other does not sound. Thus, nonsimultaneous frequency ranges may, in some instances, sound over a common period of time.

There are at least four types of frequency ranges that are or may be considered nonsimultaneous. "Coterminal" frequency ranges are those ranges which either begin or end at the same time. For example, when a first frequency range sounds over time interval from 0 μs to 10 μs and a second frequency range sounds over time interval 0 μs to 5 μs, they are considered coterminal ranges. "Nesting" frequency ranges are to the instance when a frequency range lies completely within another. For example, when a first frequency range sounds over the time interval spanning from 0 μs to 10 μs and a second frequency range sounds over the time interval spanning from 2 μs to 7 μs, they are considered nesting ranges. "Offset" frequency ranges are those ranges which overlap but neither begin nor end at the same time. For example, when a first frequency range sounds over time interval from 0 μs to 10 μs and a second frequency range sounds over the time interval spanning from 5 μs to 15 μs, they are considered offset ranges. "Nonoverlapping" frequency ranges are those ranges which do not sound over any common period of time. For example, when a first frequency range sounds over time interval from 0 μs to 10 μs and a second frequency range begins to sound after time 10 μs, they are considered nonoverlapping ranges.

Accordingly, the term "nonsimultaneous and discrete" as in "acoustic radiation having a plurality of nonsimultaneous and discrete frequency ranges" refers to a plurality of sound waves, each having a plurality of frequencies but sounding over different periods of time. In some instances, nonsimultaneous and discrete frequency ranges may overlap in frequency and/or in time. Alternatively, nonsimultaneous and discrete frequency ranges may not overlap in frequency and/or time. Graphical representations of exemplary acoustic radiation having a plurality of nonoverlapping, nonsimultaneous and discrete frequency ranges are provided in FIG. 1A-1C.

The term "reservoir" as used herein refers to a receptacle or chamber for containing a fluid. Typically, a fluid contained in a reservoir necessarily will have a free surface, e.g., a surface that allows acoustic radiation to be reflected therefrom or a surface from which a droplet may be acoustically ejected. A reservoir may also be a locus on a substrate surface within which a fluid is constrained.

The terms "secondary" and "satellite" as in "secondary droplet" or "satellite fluid" are interchangeably used to refer to an additional droplet or body of fluid ejected as a byproduct, often unwanted, associated with the ejection of a primary droplet.

The term "resonance" refers to the interaction of acoustic waves in a cavity formed between two reflecting surfaces in which acoustic waves may travel back and forth. For typical ejection applications, one reflecting surface may be the surface of the fluid to be ejected or the surface of the acoustic lens. In addition, other surfaces may correspond to any membranes or structures placed in the acoustic path between the transducer and the free fluid surface such as the bottom of a microplate. The transmission of acoustic energy from the acoustic generator to the focus of the acoustic energy may be effected by the presence of resonant reverberations between a pair of surfaces. A resonant system can act like an interference filter where some acoustic frequencies within the frequency range will provide very effective coupling of energy to the fluid surface and other acoustic frequencies within the frequency range may provide very poor energy coupling.

In typical situations, due to either thermal drift or mechanical drift, one may expect that the precise frequency of constructive or destructive interference in such a resonant system will drift over time. Hence, the resonant frequency response of a given well in a microplate may change over time. Also, changes from well to well in a microplate of the plate bottom thickness or material properties may also lead to well-to-well variations in resonant frequency response. Thus it is not feasible typically to generate only a single acoustic frequency for the purpose of drop ejection, as the coupling of acoustic energy to the fluid surface may not be stable with time or across a given microplate. A simple linear chirp throughout the duration of the toneburst, if the extent of the chirp is sufficiently broad to span several acoustic frequencies of constructive and destructive interference in the system, will usually suffice to wash out such resonant behavior. The use of linear chirp makes the system more stable to mechanical, thermal and spatial changes. There is a difficulty however with such an approach, in that as the acoustic frequency is swept over the duration of the toneburst, the acoustic energy effectively coupled to the free fluid surface will vary in time, for example increasing as the chirp frequency approaches a condition of constructive interference, and decreasing as the chirp frequency approaches a condition of destructive interference. This has the potentially undesirable effect of introducing an amplitude modulation to the acoustic excitation of the fluid surface. In order to minimize the effect of this amplitude modulation on the consistency of drop generation, multiple frequency chirps are introduced over the period of the toneburst excitation. Residual amplitude modulation may still exist in the effective coupling of acoustic energy to the fluid surface, yet any modulation will occur more rapidly over time and be spread more uniformly over the duration of the delivery of acoustic energy. The fluid surface will be more likely in such a case to react to the average energy that is coupled over the duration of the toneburst and to be less sensitive to both time-dependent or well-to-well variations in resonant frequency response.

The term "substantially the same volume" as used herein refers to a plurality of volumes that differ by no more than 20%, preferably by no more than 10%, more preferably by no more than 5%, and optimally by no more than 3%. Other uses of the term "substantially" have an analogous meaning.

The term "substrate" as used herein refers to any material having a surface onto which one or more fluids may be deposited. The substrate may be constructed in any of a number of forms including, for example, wafers, slides, well plates, or membranes. In addition, the substrate may be porous or nonporous as required for deposition of a particular fluid. Suitable substrate materials include, but are not limited to, supports that are typically used for solid phase chemical synthesis, such as polymeric materials (e.g., polystyrene, polyvinyl acetate, polyvinyl chloride, polyvinyl pyrrolidone, polyacrylonitrile, polyacrylamide, polymethyl methacrylate, polytetrafluoroethylene, polyethylene, polypropylene, polyvinylidene fluoride, polycarbonate, and divinylbenzene styrene-based polymers), agarose (e.g., Sepharose®), dextran (e.g., Sephadex®), cellulosic polymers and other polysaccharides, silica and silica-based materials, glass (particularly controlled pore glass, or "CPG") and functionalized glasses, ceramics, such substrates treated with surface coatings, e.g., with microporous polymers (particularly cellulosic polymers such as nitrocellulose), microporous metallic compounds (particularly microporous aluminum) antibody-binding proteins (available from Pierce Chemical Co., Rockford Ill.), bisphenol A polycarbonate, or the like. Additional information relating to the term "substrate" can be found in U.S. Patent Application Publication No. 200200377579 to Ellson et al.

In general, the invention pertains to the ejection of a droplet from a reservoir of fluid through the use of focused acoustic radiation. Unlike known acoustic ejection technology, the focused acoustic radiation used has a plurality of nonsimultaneous and discrete frequency ranges that at least determines in part the volume and/or velocity of the ejected droplet. As a result, greater range of droplet volumes and/or velocities may be produced. For example, the invention may be used to increase the volume of the ejected droplet. In addition, the velocity of the ejected droplet may be increased. In any case, the frequency ranges may vary according to the desired performance. Often, the frequency ranges, their amplitudes, and their separation period are selected to suppress ejection of satellite fluid from the reservoir. In particular, satellite fluid ejection may be suppressed via active recapture and/or secondary push mechanisms, which are discussed in detail below.

The invention is particularly suited for use with a focusing means having a high F-number, e.g., F2 or greater. Such focusing means may be used in conjunction with a plurality of reservoirs, e.g., wherein the reservoirs form a source well plate comprising a plurality of source wells. The invention is also suited for increasing the rate at which fluid is transferred from a reservoir to a substrate, e.g., transferring fluid from a source well plate to a target well plate. Repeatability and accuracy may be improved as well.

Figure 1B:
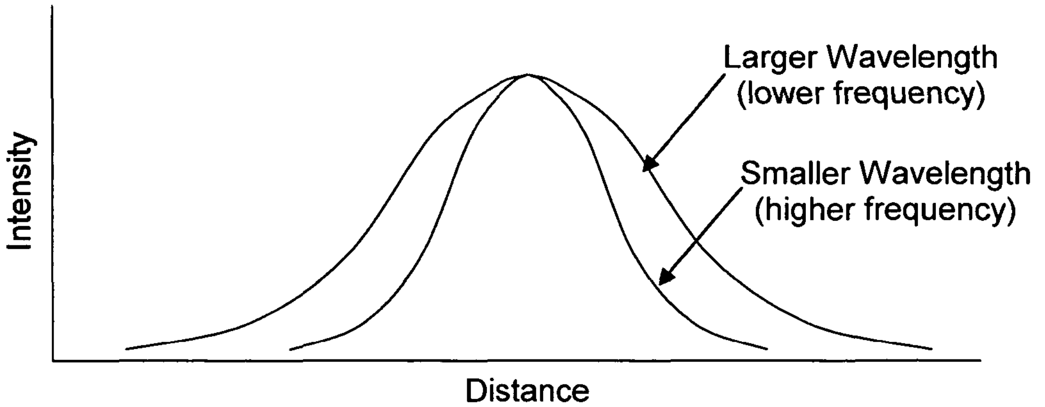

In order to provide the appropriate context to the invention and to elucidate the novel and nonobvious aspects thereof, it should be noted that ejection of droplets from the free surface of a fluid is known to occur when acoustic energy of sufficient intensity is focused through the fluid medium onto the surface of the fluid. As depicted in FIG. 1, various factors affect the spatial distribution of the intensity of the acoustic radiation at the fluid surface of the surface. For example, F-numbers represent the ratio of the distance from the focusing means to the focal point of the focusing means with respect to the size of the aperture though which the acoustic energy passes into the fluid medium. All else being equal, a lens of a smaller F-number tends to generate a more tightly focused acoustic radiation, as illustrated in FIG. 1A, than a lens of a higher F-number. Similarly, as illustrated in FIG. 1B, acoustic radiation having a higher frequency may be focused over a smaller surface area than acoustic radiation having a lower frequency.

In particular, lenses having an F-number less than one are considered to generate tightly focused acoustic beams. The focal distance of such a lens is shorter than the width of the lens aperture. Droplet ejection behavior from lenses with F-numbers very close to 1 is well known in the art. In particular, the relationships between the focused beam size and resulting droplet size are well understood, as well as the relationships that govern the sensitivity of the ejection to fluid height (i.e. to the relative placement of the fluid surface with respect to the focal plane of the acoustic beam).

These relationships in many instances limit the performance of the droplet ejection, or limit the flexibility to construct a physical system to eject droplets of different size, etc., or place strong constraints on the tolerance of an ejection system to the variation of certain critical parameters, such as the location of the fluid surface with respect to the focal plane of the acoustic beam. In addition, using a tightly focusing acoustic wave limits the ability to eject droplets from the top of a fluid layer of height h, when the acoustic beam must past through an aperture of width substantially less than h, at the bottom of the fluid layer. Such a configuration is of interest for many applications, particularly when the reservoirs for containing the fluid to be ejected take the form of conventionally used and commercially available well plates. Typical 1536 well plates from Greiner have height (H) to aperture (A) ratios of 3.3 (5 H/1.53 A mm). Plates from Greiner and NUNC in 384 well format range from 3 to 4 (5.5H/1.84 A mm and 11.6H/2.9 A mm). Additional manufactures of suitable well plates for use in the employed device include Corning, Inc. (Corning, N.Y.) and Greiner America, Inc. (Lake Mary, Fla.).

When excess power is applied, secondary droplets (also known as satellite droplets) are ejected. Generally, the size of a secondary droplet appears to be dependent on the acoustic frequency and the properties of the fluid. For example, at a very low frequency in the 5-10 MHz range, large secondary droplets may be formed.

While secondary or satellite droplets may be formed using either higher or lower F-number focusing lenses, the advantages associated with the use of higher F-number focusing means and lenses are discussed in U.S. Pat. No. 6,416,164 to Stearns et al. For example, secondary droplets produced using a higher F-number lens have properties that differ from those formed using a lower F-number lens. Typically, the secondary droplet formed using an F1 lens with water is typically much smaller than the primary droplet. In the case of an F3 lens, the secondary droplet may be much larger than the primary droplet.

As discussed above, increased power may result in the ejection of a primary droplet having an increased volume. For example, during experiments in which a 50-watt amplifier for an acoustic ejector was used, it was found that a droplet having a maximum volume of 25 nL may be ejected at a particular frequency range. When the 50-watt amplified was replaced with a more powerful 200-watt amplifier, it was discovered that a plurality of frequency ranges were generated instead of a single frequency. As a result, the performance of the ejector was unexpectedly improved. Stroboscopic images indicate that one frequency range may contribute to initial mound/droplet formation, while another contributes to the velocity and/or volume of the droplet. In short, the frequency ranges work synergistically to increase droplet velocity and/or volume.

Figure 2A:
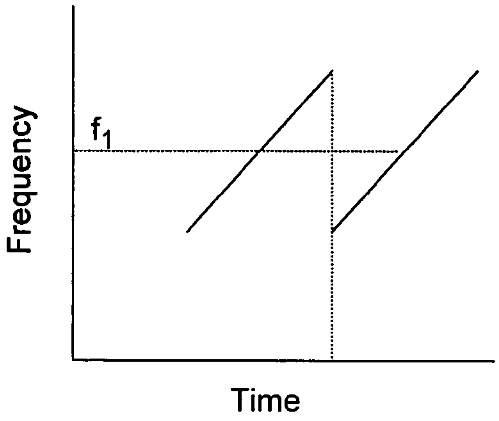
FIGS. 2A-2G, collectively referred to as FIG. 2, are graphical representations of different types of acoustic radiation.
Figure 2B:
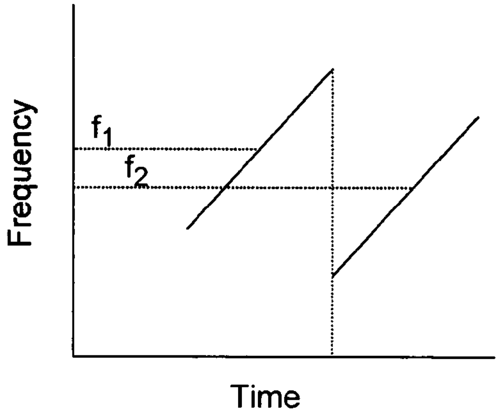
Figure 2C:
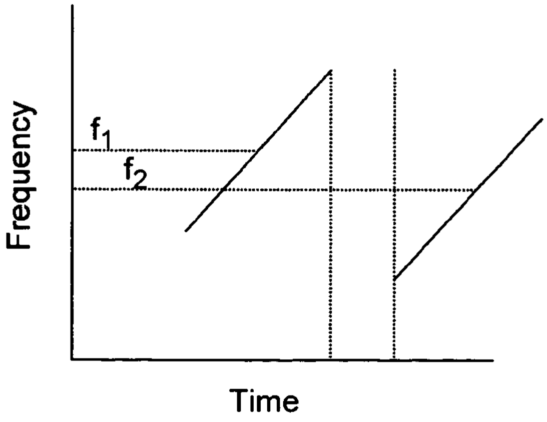

Variation of the duration, amplitude, profile, order, and other characteristics of the frequency ranges enables significant variation in the range of ejected fluid volume and/or velocity. FIG. 2 graphically represents of different types of acoustic radiation. The acoustic radiation depicted in FIGS. 2A-2C are each individually suitable for use with the invention. For example, FIG. 2A depicts acoustic radiation having a plurality of nonsimultaneous and discrete repeating frequency ranges in the form of linear acoustic sweeps. The linear acoustic sweeps have identical upper and lower frequency limits, exhibit identical profiles (slopes), and display the same characteristic frequency, i.e., $f_1$. FIG. 2B depicts acoustic radiation similar to that depicted in FIG. 2A except that the linear acoustic sweeps have different frequency limits. Accordingly, the linear acoustic sweeps of FIG. 2B display different characteristic frequencies. FIG. 2C depicts acoustic radiation similar to that depicted in FIG. 2B except that a period of silence separates the linear acoustic sweeps of different characteristic frequencies.

Figure 2D:
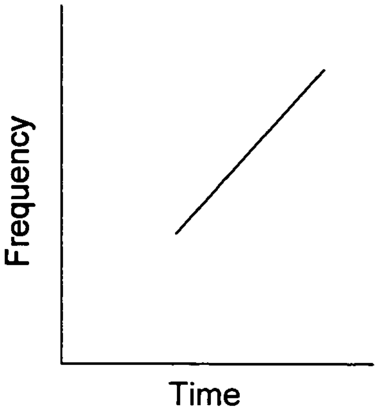
Figure 2E:
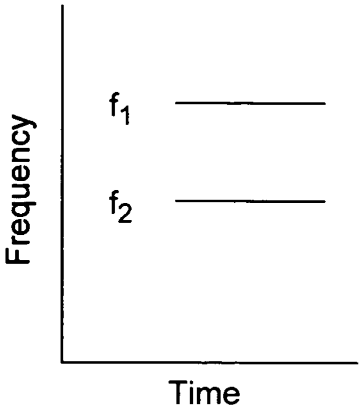
Figure 2F:
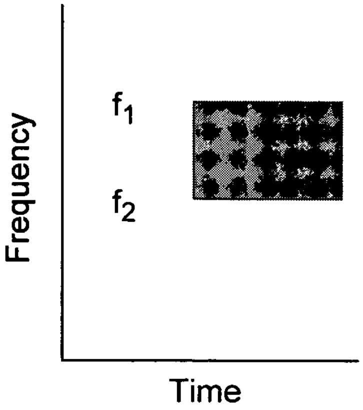
Figure 2G:
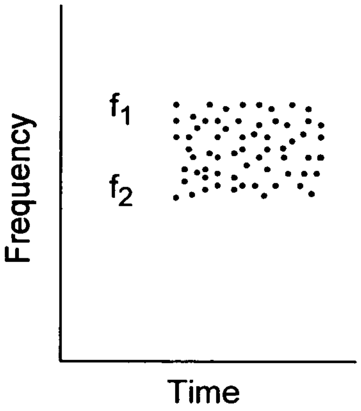
Figure 3A:
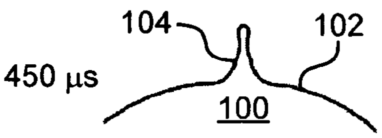
FIG. 3A-3G, collectively referred to as FIG. 3, are tracings from a series of successive stroboscopic images taken at 50 μs intervals that depict the free surface of a fluid reservoir during the ejection of a droplet using acoustic radiation that also serves to suppress satellite fluid ejection via an active recapture mechanism.
Figure 3B:
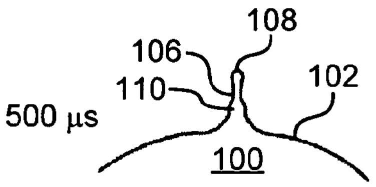
Figure 3C:
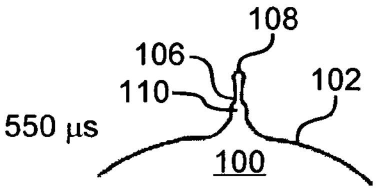
Figure 3D:
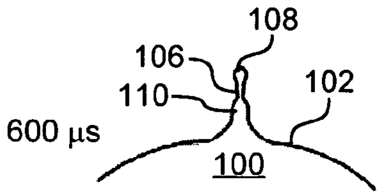
Figure 3E:
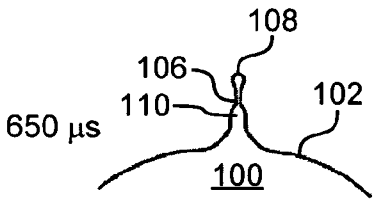
Figure 3F:
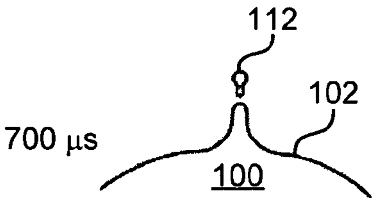
Figure 3G:
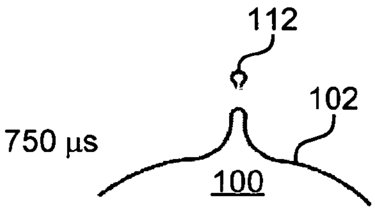
Figure 4A:
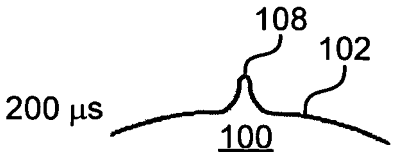
FIGS. 4A-4G, collectively referred to as FIG. 4, are tracings form a series of successive stroboscopic images that depict the free surface of a fluid reservoir during the ejection of a droplet using acoustic radiation that also serves to suppress satellite fluid ejection via a secondary push mechanism.
Figure 4B:
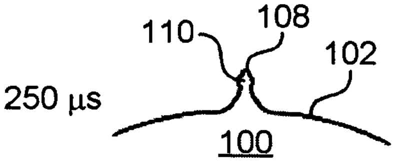
Figure 4B:
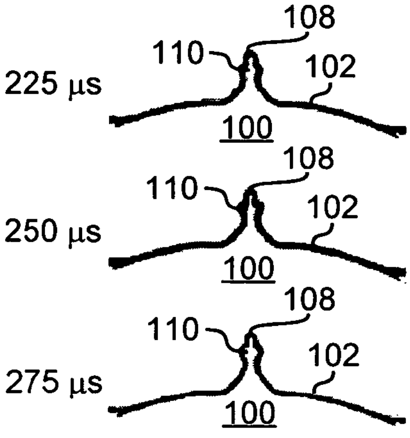
Figure 4C:
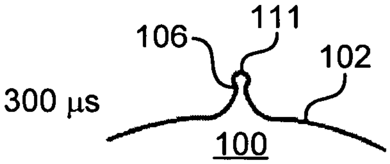
Figure 4D:
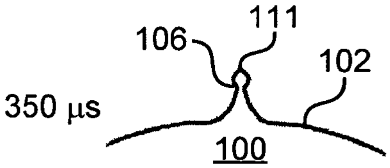
Figure 4E:
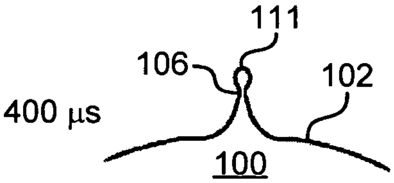
Figure 4F:
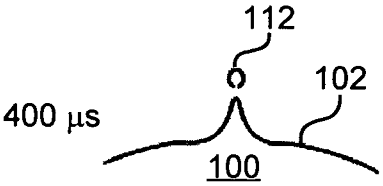
Figure 4G:
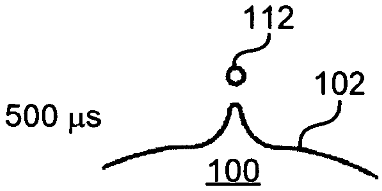

It is, of course, understood that optimal variations of the above-discussed parameters will depend upon the desired ejected drop volume, specific fluids and lens selected and such modifications are well within the abilities of one of skill in the art. To provide further context with respect to the invention, FIG. 2D depicts a linear acoustic sweep (also commonly referred to as a linear chirp). FIG. 2E depicts acoustic radiation having dual simultaneous frequencies. FIG. 2F depicts acoustic radiation having broadband frequencies. FIG. 2G depicts acoustic radiation having random frequencies. These figures depict acoustic radiation described in U.S. Pat. No. 4,308,547 to Lovelady et al., and U.S. Pat. No. 5,122,818 to Elrod et al. From visual inspection of FIGS. 2D-2G, it should be evident that acoustic radiation depicted in FIGS. 2D-2G are each individually unsuitable for use the invention since none depicts acoustic radiation having a plurality of nonsimultaneous and discrete frequency ranges. Nevertheless, in view of FIGS. 2A-2C, one of ordinary skill in the art will recognize that acoustic radiation comprised of nonsimultaneous and discrete frequency ranges may be produced by modifying, combining, and/or adapting the frequency ranges depicted in FIGS. 2D-2G.

The invention may be used to suppress ejection of satellite fluid from the reservoir via acoustic means. There are at least two different mechanisms through which satellite fluid ejection may be suppressed—via "active recapture" and "secondary push." In both cases, a transient droplet-forming feature is first created at a free fluid surface. The transient feature, typically formed by causing acoustic waves to converge at a focal point in the fluid near the fluid surface, has sufficient momentum to form a droplet of a nominal volume and a nominal velocity for ejection from the reservoir. Then, acoustic radiation is applied to the fluid in a manner effective to modify the momentum of the feature. As a result, a droplet is ejected having an actual volume that differs from the nominal volume and/or an actual velocity that differs from the nominal velocity.

FIG. 3 provides an illustration of the active recapture mechanism of the present invention, which prevents formation of secondary or satellite droplets by ensuring the formation of a single elongated fluid from which the primary droplet will emerge. Under this mechanism, a unitary droplet formed through the application of at least two tonebursts of focused acoustic radiation. The first toneburst results in the elongation depicted in FIG. 3A, and the acoustic energy from the second toneburst arrives shortly thereafter resulting in the elongation depicted in FIG. 3B. As depicted in FIG. 3A, a fluid 100 is provided having a surface 102 and an elongate transient feature 104, which is formed at time 450 μs at the fluid surface via the upward application of the first toneburst of focused acoustic radiation to a focal point near the fluid surface 102. FIGS. 3B-3E depicts the continued elongation of the transient feature 104. After the application of the second toneburst of focused acoustic radiation, a necking region 106 and a trailing lobe 110 begins to form as depicted in FIG. 3B. As a result of the application of the second toneburst, the upper portion of the feature 104 is transformed into a leading lobe 108. In FIG. 3F, the leading lobe 108 is separated from the trailing lobe 110, thereby forming a unitary droplet 112. The application of the second toneburst has the advantage of helping to stabilize the necking region 106 by the generation of a trailing lobe 110, which serves to stabilize the drop breakoff such that the unitary droplet 112 is released without the formation of a secondary or satellite droplet. If desired, more than two tonebursts of focused acoustic energy may be used in order to form the unitary droplet 112. Another advantage of the multiple tonebursts is that the leading lobe 108 and the trailing lobe 110 are both significantly smaller with multiple tonebursts than they are with single tonebursts. The smaller leading lobes 108 and trailing lobes 110 are especially useful for high repetition ejection where reverberating capillary waves can interfere with the ejection process or for small well ejection to avoid interaction of the elongate transient feature 104 with the well walls during the ejection process.

If the focused acoustic radiation is applied at a high power level without the immediate secondary toneburst as described above, necking may also occur in the transient feature 104 below the trailing lobe 110. As a result, the trailing lobe 110 may break away from surface 102, thereby forming a satellite or secondary droplet. The active recapture mechanism of the present invention prevents the undesirable formation of the secondary droplet.

FIG. 4 provides an illustration of the secondary push mechanism of the present invention, which prevents the formation of a secondary droplet through a fluidic merging process. Again, a fluid 100 is provided having a surface 102. As depicted in FIG. 4A, a transient feature 104 is formed at time 200 μs at the fluid surface via the upward application focused acoustic radiation to a focal point near the fluid surface 102. FIG. 4B depicts the application of an additional burst of acoustic radiation. As a result, a trailing lobe 110 is formed near the base of feature 104, and the upper portion of feature 104 is transformed into a leading lobe 108. FIG. 4B' shows the formation of convex lobes 108 and 110 separated by at least one concave region. As depicted in FIG. 4C, surface forces may smooth the lobular surfaces and thereby merging the lobes into a spheroid 111 protruding from the lower portion of feature 104. The secondary push mechanism is not limited to the application of one additional focused acoustic radiation toneburst; rather at least two tonebursts is sometimes preferable in order to merge the lobes to form the spheroid. Like the active recapture mechanism, the secondary push mechanism prevents the formation of secondary or satellite droplets and is useful for high repetition ejection and small well ejection. Both the active recapture and the secondary push mechanism can eject a droplet at a rate that is at least two fold faster, preferably four times faster, and more preferably ten times faster than the rate of ejection of a droplet using a single focused acoustic radiation toneburst. FIGS. 4C-4E depicts the continued elongation of the transient feature 104. As the feature elongates, a necking region 106 begins to form below the spheroid 111. Eventually, the necking region is pinched off, resulting in the formation of droplet 112. Although droplet 112 is depicted as substantially spherical, a spherical shape is not required. In some instances, the droplet is "pinched off" before lobes 108 and 110 are merged. In such a case, a unitary fluid droplet may be formed having a transient exterior surface profile comprised of a plurality of convex lobes separated by at least one concave region. In any case, as shown in FIGS. 4F and 4G, droplet 112 continues to travel upwards, while surface forces smooth surface 102.

In one embodiment, then, the invention provides a device that includes at least one reservoir adapted to contain a fluid, an acoustic ejector, and a means for positioning the acoustic ejector in acoustic coupling relationship with the reservoir. Typically, a single ejector is used comprising an acoustic radiation generator and a focusing means for focusing the acoustic radiation generated by the acoustic radiation generator. However, a plurality of ejectors may be advantageously used as well. Likewise, although a single reservoir may be used, the device typically includes a plurality of reservoirs. Irrespective of the number of ejectors and reservoirs used, the generated acoustic radiation has nonsimultaneous and discrete first and second frequency ranges and is used to eject a droplet having a volume and/or velocity that is determined in part by each of the frequency ranges.

The device may be constructed to include the reservoirs as an integrated or permanently attached component of the device. However, to provide modularity and interchangeability of components, it is preferred that device be constructed with removable reservoirs. Generally, the reservoirs are arranged in a pattern or an array to provide each reservoir with individual systematic addressability. In addition, while each of the reservoirs may be provided as a discrete or stand-alone item, in circumstances that require a large number of reservoirs, it is preferred that the reservoirs be attached to each other or represent integrated portions of a single reservoir unit. For example, the reservoirs may represent individual wells in a well plate. Many well plates suitable for use with the device are commercially available and may contain, for example, 96, 384, 1536, or 3456 wells per well plate, having a full skirt, half skirt, or no skirt. The wells of such well plates typically form rectilinear arrays.

However, the availability of such commercially available well plates does not preclude the manufacture and use of custom-made well plates containing at least about 10,000 wells, or as many as 100,000 to 500,000 wells, or more. The wells of such custom-made well plates may form rectilinear or other types of arrays. As well plates have become commonly used laboratory items, the Society for Biomolecular Screening (Danbury, Conn.) has formed the Microplate Standards Development Committee to recommend and maintain standards to facilitate the automated processing of small volume well plates on behalf of and for acceptance by the American National Standards Institute.

Furthermore, the material used in the construction of reservoirs must be compatible with the fluids contained therein. Thus, if it is intended that the reservoirs or wells contain an organic solvent such as acetonitrile, polymers that dissolve or swell in acetonitrile would be unsuitable for use in forming the reservoirs or well plates. Similarly, reservoirs or wells intended to contain DMSO must be compatible with DMSO. For water-based fluids, a number of materials are suitable for the construction of reservoirs and include, but are not limited to, ceramics such as silicon oxide and aluminum oxide, metals such as stainless steel and platinum, and polymers such as polyester and polytetrafluoroethylene. For fluids that are photosensitive, the reservoirs may be constructed from an optically opaque material that has sufficient acoustic transparency for substantially unimpaired functioning of the device.

In addition, to reduce the amount of movement and time needed to align the acoustic radiation generator with each reservoir or reservoir well during operation, it is preferable that the center of each reservoir be located not more than about 1 centimeter, more preferably not more than about 1.5 millimeters, still more preferably not more than about 1 millimeter and optimally not more than about 0.5 millimeter, from a neighboring reservoir center. These dimensions tend to limit the size of the reservoirs to a maximum volume. The reservoirs are constructed to contain typically no more than about 1 mL, preferably no more than about 1 μL, and optimally no more than about 1 nL, of fluid. To facilitate handling of multiple reservoirs, it is also preferred that the reservoirs be substantially acoustically indistinguishable.

A vibrational element or transducer is used to generate acoustic radiation. In some instances, the acoustic radiation generator is comprised of a single transducer. In addition, the transducer may use a piezoelectric element to convert electrical energy into mechanical energy associated with acoustic radiation. Alternatively, multiple element acoustic radiation generators such as transducer assemblies may be used. For example, linear acoustic arrays, curvilinear acoustic arrays or phased acoustic arrays may be advantageously used to generate acoustic radiation that is transmitted simultaneous to a plurality of reservoirs. In one embodiment, the single transducer may include at least two separate active areas, such as for example, two concentric annular areas. Upon application of the focused acoustic radiation in a single frequency sweep, the inner annular portion is activated first followed by the activation of the outer annular portion. With this embodiment, the spot size may be adjusted to a desired size without having to use more than one frequency sweep.

The frequency ranges generated by the acoustic generator may vary according to the desired performance of the inventive device. For example, the second frequency range may be an integer multiple of the first frequency range. In addition, each frequency range may be comprised of a different range of frequencies. Typically, though, at least one frequency range is comprised of an acoustic sweep through the range. Optionally, each frequency range is comprised of an acoustic sweep through a different range of frequencies. For example, at least one acoustic sweep may be a linear sweep.

The nonsimultaneous frequency ranges associated with the invention may be produced by the same acoustic generator. In some instances, the first and second frequency ranges are alternatingly produced. In addition, or in the alternative the first and second frequency ranges may be repeatedly produced by the acoustic radiation generator. Furthermore, the first and second frequency ranges may be separated by a predetermined period during which no acoustic radiation is produced that substantially determines the volume and/or velocity of the ejected droplet. For example, the acoustic generator may be completely silent during the predetermined period.

Additional variables may be controlled to effect desired ejection performance. For example, the first frequency range may be used to effect ejection of the droplet and the second frequency range may be used to acoustically suppress ejection of satellite fluid from the reservoir. In such a case, the droplet ejected may have a volume that is greater than the volume of a droplet ejected using the same focused acoustic radiation without the second frequency range. In addition, or in the alternative, the droplet ejected by the device may have a velocity that is higher than the velocity of a droplet ejected using the same focused acoustic radiation but without the second frequency range. In some instances, the volume of droplet ejected by the device may be increased by at least 100% over the volume of a droplet ejected using the same focused acoustic radiation but without the second frequency range. Similarly, the velocity of the droplet ejected by the device may be increased by at least 10% over the velocity of a droplet ejected using the same focused acoustic radiation but without the second frequency range. Furthermore, the amplitude of one or more frequency ranges may be altered. For example, the relative amplitudes of the frequency ranges may be altered, independently or otherwise.

Any of a variety of focusing means may be employed to focus acoustic radiation so as to eject droplets from a reservoir. For example, one or more curved surfaces may be used to direct acoustic radiation to a focal point near a fluid surface. One such technique is described in U.S. Pat. No. 4,308,547 to Lovelady et al. Focusing means with a curved surface have been incorporated into the construction of commercially available acoustic transducers such as those manufactured by Panametrics Inc. (Waltham, Mass.). In addition, Fresnel lenses are known in the art for directing acoustic energy at a predetermined focal distance from an object plane. See, e.g., U.S. Pat. No. 5,041,849 to Quate et al. Fresnel lenses may have a radial phase profile that diffracts a substantial portion of acoustic energy into a predetermined diffraction order at diffraction angles that vary radially with respect to the lens. The diffraction angles should be selected to focus the acoustic energy within the diffraction order on a desired object plane. As the invention is particularly suited for use with wells having a high height-to diameter ratio, a high-F-number focusing means may be used. For example, the focusing means of the inventive device may have an F-number of at least 2 or 3.

When a single acoustic radiation ejector is employed, the positioning means should allow for the ejector to move from one reservoir to another quickly and in a controlled manner. In order to ensure optimal performance, it is important to keep in mind that there are two basic kinds of motion: pulse and continuous. Pulse motion involves the discrete steps of moving an ejector into position, keeping it stationary while it emits acoustic energy, and moving the ejector to the next position; again, using a high performance positioning means allows repeatable and controlled acoustic coupling at each reservoir in less than 0.1 second. Typically, the pulse width is very short and may enable over 10 Hz reservoir transitions, and even over 1000 Hz reservoir transitions. A continuous motion design, on the other hand, moves the acoustic radiation generator and the reservoirs continuously, although not at the same speed. As discussed above, the reservoirs may be constructed to reduce the amount of movement and time needed to align the acoustic radiation generator with each reservoir or reservoir well during operation. In short, either or both of the reservoirs and the ejector may be moved, simultaneously or otherwise.

Thus, the inventive method typically allows the ejector to be coupled to wells of a well plate at a rate of at least about 96 wells per minute. Faster coupling rates of at least about 384, 1536, and 3456 wells per minute are achievable with present day technology as well. Thus, the invention can be operated to couple a single ejector successively to each well of most (if not all) well plates that are currently commercially available. Proper implementation of the inventive method should yield a coupling rate of at least about 10,000 wells per minute.

The invention may be used to eject fluid from the reservoirs onto a substrate. For example, it is described in U.S. Patent Application Publication No. 20020037579 to Ellson et al. that such acoustic ejection technology may be used to form biomolecular arrays. Similarly, acoustic ejection technology may be employed to format a plurality of fluids, e.g., to transfer fluids from odd-sized bulk containers to wells of a standardized well plate or to transfer fluids from one well plate to another. One skilled in the art will recognize that such acoustic ejection technologies may be adapted for a variety of applications. In such applications, a means for positioning the substrate may be employed to provide relative motion between the substrate and the reservoirs. In some instances, high-speed robotic systems may be employed to handle the reservoirs, the acoustic generator and/or the ejector.

An analyzer may be used to assess the contents of the selected reservoirs. For example, the analyzer may be used to determine the volume of fluid in the reservoir or a property of fluid in the reservoirs. The fluid properties that may be determined include, but are not limited to, viscosity, surface tension, acoustic impedance, density, solid content, impurity content, acoustic attenuation, and pathogen content. Additional information relating to acoustic assessment can be found in U.S. Patent Application Publication No. 20030150257 to Mutz et al.

In some instances, a decision may be made as to whether and/or how to dispense fluid from the reservoir depending on the results of acoustic assessment. For example, when an acoustic ejector is employed, operating parameters relating to the ejector may be determined by using the data from the above-described assessment relating to reservoir volume or fluid property data, as well as geometric data associated with the reservoir. In addition, the data may show the need to reposition the ejector so as to reposition the acoustic radiation generator with respect to the fluid surface, in order to ensure that the focal point of the ejection acoustic wave is near the fluid surface, where desired. For example, if assessment reveals that the ejection acoustic wave cannot be focused near the fluid surface, the ejector may be repositioned using vertical, horizontal, and/or rotational movement to allow appropriate focusing of the ejection acoustic wave.

Resonance represents an important issue pertaining to the invention. Generally, resonance should be minimized for all components of the device. Thus, for example, neither the reservoir, any fluid contained therein, nor a combination thereof should facilitate resonance of any frequency range of the acoustic radiation generated by the acoustic radiation generator.

Thus, the invention also provides a method for ejecting a droplet from a reservoir of fluid. The method involves applying focused acoustic radiation to a reservoir containing a fluid in a manner effective to eject a droplet therefrom. The applied focused acoustic radiation has a plurality of nonsimultaneous and discrete frequency ranges, and the ejected droplet has a volume and/or velocity that is determined in part by each frequency range. Optionally, the fluid in the reservoir is interrogated acoustically before focused acoustic radiation is applied to eject a droplet therefrom.

The focused acoustic radiation may be repeatedly applied to the fluid in the reservoir so as to eject a plurality of droplets, e.g., having substantially the same volume, therefrom. When the invention is used to suppress ejection of satellite fluid, droplets may be ejected at a rate faster than that possible using the same focused acoustic radiation without a particular frequency range. For example, ejection rate may be increased by at least 10%.

In addition, when droplets are ejected from different reservoirs, the reservoirs exhibit substantially the same resonance performance relative to any frequency range of the acoustic radiation generated by the acoustic radiation generator. That is, droplet ejection should be insensitive to any slight variations in the frequencies where resonance absorption of transmitted acoustic energy may occur. Since the invention allows multiple cycle sweeps over the same frequency range, it is preferred that any energy change due to resonance absorption is "shared" over the whole time period rather than have it impact the early part of the time period in one reservoir and then occur late in the time period in another reservoir.

The invention also provides a method that involves applying focused acoustic radiation to a reservoir containing a fluid that has a surface in a manner effective to form a transient droplet-forming feature at the fluid surface. The feature has sufficient momentum to form a droplet of a nominal volume and a nominal velocity for ejection from the reservoir. Then, additional acoustic radiation is applied to the fluid is initiated, in a manner effective to modify the momentum of the feature. As a result, a droplet is ejected having an actual volume that differs from the nominal volume and/or an actual velocity that differs from the nominal velocity. That is, the actual volume of the ejected droplet may be greater or less than the nominal volume, the actual velocity of the ejected droplet may be greater or lower than the nominal velocity, and the actual and nominal velocities may have different directionalities.

While the successive application of acoustic radiation may overlap in some instances, the more typical practice involves applying additional acoustic radiation after the application of acoustic radiation is complete. In addition, the acoustic radiation applied to form the feature may differ from the radiation applied to modify the momentum of the feature. For example, they may exhibit different characteristic frequencies.

The invention may employ or provide certain additional performance-enhancing functionalities. For example, for fluids that exhibit temperature-dependent properties, a temperature measurement means known in art, such as thermocouples, may be used in conjunction with such analyses. Temperature controlling means may be also employed to improve the accuracy of measurement and may be employed regardless of whether the device includes a fluid dispensing functionality. In the case of aqueous fluids, the temperature controlling means should have the capacity to maintain the reservoirs at a temperature above about 0° C. In addition, the temperature controlling means may be adapted to lower the temperature in the reservoirs. Such temperature lowering may be required because repeated application of acoustic energy to a reservoir of fluid may result in heating of the fluid. Such heating can result in unwanted changes in fluid properties such as viscosity, surface tension, and density. Design and construction of such temperature controlling means are known to one of ordinary skill in the art and may comprise, e.g., components such a heating element, a cooling element, or a combination thereof.

Moreover, the invention may be adapted to dispense fluids of virtually any type and amount desired. The fluid may be aqueous and/or nonaqueous. Examples of fluids include, but are not limited to, aqueous fluids including water per se and water-solvated ionic and non-ionic solutions, organic solvents, lipidic liquids, suspensions of immiscible fluids, and suspensions or slurries of solids in liquids. Because the invention is readily adapted for use with high temperatures, fluids such as liquid metals, ceramic materials, and glasses may be used; see, e.g., U.S. Patent Application Publication Nos. 2002007375 and 2002155231 to Ellson et al. Furthermore, because of the precision that is possible using the inventive technology, the invention may be used to eject droplets from a reservoir adapted to contain no more than about 100 mL of fluid, preferably no more than 10 mL of fluid. In certain cases, the ejector may be adapted to eject a droplet from a reservoir adapted to contain about 1 to about 100 mL of fluid. This is particularly useful when the fluid to be ejected contains rare or expensive biomolecules, wherein it may be desirable to eject droplets having a volume of about 1 picoliter or less, e.g., having a volume in the range of about 0.025 pL to about 1 pL.

FIG. 5 illustrates an exemplary embodiment of the inventive device in simplified cross-sectional view. In this embodiment, the inventive device allows for acoustic assessment of the contents of a plurality of reservoirs as well as acoustic ejection of fluid droplets from the reservoirs. The inventive device is shown in operation to form an array of features on a substrate. The device 1 includes a plurality of reservoirs, i.e., at least two reservoirs, with a first reservoir indicated at 13 and a second reservoir indicated at 15. Each is adapted to contain a fluid having a fluid surface. As shown, the first reservoir 13 contains a first fluid 14 and the second reservoir 15 contains a second fluid 16. Fluids 14 and 16 each have a fluid surface respectively indicated at 145 and 16S. Fluids 14 and 16 may the same or different.

As shown, the reservoirs have a height-to diameter-ratio greater than one and are of substantially identical construction so as to be substantially acoustically indistinguishable, but identical construction is not a requirement. The reservoirs are shown as separate removable components but may, as discussed above, be fixed within a plate or other substrate. For example, the plurality of reservoirs may comprise individual wells in a well plate, optimally although not necessarily arranged in an array. Each of the reservoirs 13 and 15 is preferably axially symmetric as shown, having vertical walls 13W and 15W extending upward from circular reservoir bases 13B and 15B and terminating at openings 130 and 150, respectively, although other reservoir shapes may be used. The material and thickness of each reservoir base should be such that acoustic radiation may be transmitted therethrough and into the fluid contained within the reservoirs.

The device also includes an acoustic ejector 33 comprised of an acoustic radiation generator 35 for generating acoustic radiation and a focusing means 37 for focusing the acoustic radiation at a focal point within the fluid from which a droplet is to be ejected, near the fluid surface. The acoustic radiation generator contains a transducer 36, e.g., a piezoelectric element, commonly shared by an analyzer. As shown, a combination unit 38 is provided that both serves as a controller and a component of an analyzer. Operating as a controller, the combination unit 38 provides the piezoelectric element 36 with electrical energy that is converted into mechanical and acoustic energy. Operating as a component of an analyzer, the combination unit receives and analyzes electrical signals from the transducer. The electrical signals are produced as a result of the absorption and conversion of mechanical and acoustic energy by the transducer.

As shown in FIG. 5, the focusing means 37 may comprise a single solid piece having a concave surface 39 for focusing acoustic radiation, but the focusing means may be constructed in other ways as discussed above. In addition, the focusing means 37 of FIG. 5 has an F-number greater than 1. The acoustic ejector 33 is thus adapted to generate and focus acoustic radiation so as to eject a droplet of fluid from each of the fluid surfaces 17 and 19 when acoustically coupled to reservoirs 13 and 15, and thus to fluids 14 and 16, respectively. The acoustic radiation generator 35 and the focusing means 37 may function as a single unit controlled by a single controller, or they may be independently controlled, depending on the desired performance of the device. Typically, single ejector designs are preferred over multiple ejector designs because accuracy of droplet placement and consistency in droplet size and velocity are more easily achieved with a single ejector.

There are also a number of ways to acoustically couple the ejector 33 to each individual reservoir and thus to the fluid therein. One such approach is through direct contact as is described, for example, in U.S. Pat. No. 4,308,547 to Lovelady et al., wherein a focusing means constructed from a hemispherical crystal having segmented electrodes is submerged in a liquid to be ejected. The aforementioned patent further discloses that the focusing means may be positioned at or below the surface of the liquid. However, this approach for acoustically coupling the focusing means to a fluid is undesirable when the ejector is used to eject different fluids in a plurality of containers or reservoirs, as repeated cleaning of the focusing means would be required in order to avoid cross-contamination. The cleaning process would necessarily lengthen the transition time between each droplet ejection event. In addition, in such a method, fluid would adhere to the ejector as it is removed from each container, wasting material that may be costly or rare.

Thus, a preferred approach would be to acoustically couple the ejector to the reservoirs and reservoir fluids without contacting any portion of the ejector, e.g., the focusing means, with any of the fluids to be ejected. To this end, the present invention provides an ejector positioning means for positioning the ejector in controlled and repeatable acoustic coupling with each of the fluids in the reservoirs to eject droplets therefrom without submerging the ejector therein. This typically involves direct or indirect contact between the ejector and the external surface of each reservoir. When direct contact is used in order to acoustically couple the ejector to each reservoir, it is preferred that the direct contact is wholly conformal to ensure efficient acoustic energy transfer. That is, the ejector and the reservoir should have corresponding surfaces adapted for mating contact. Thus, if acoustic coupling is achieved between the ejector and reservoir through the focusing means, it is desirable for the reservoir to have an outside surface that corresponds to the surface profile of the focusing means. Without conformal contact, efficiency and accuracy of acoustic energy transfer may be compromised. In addition, since many focusing means have a curved surface, the direct contact approach may necessitate the use of reservoirs having a specially formed inverse surface.

Figure 5A:
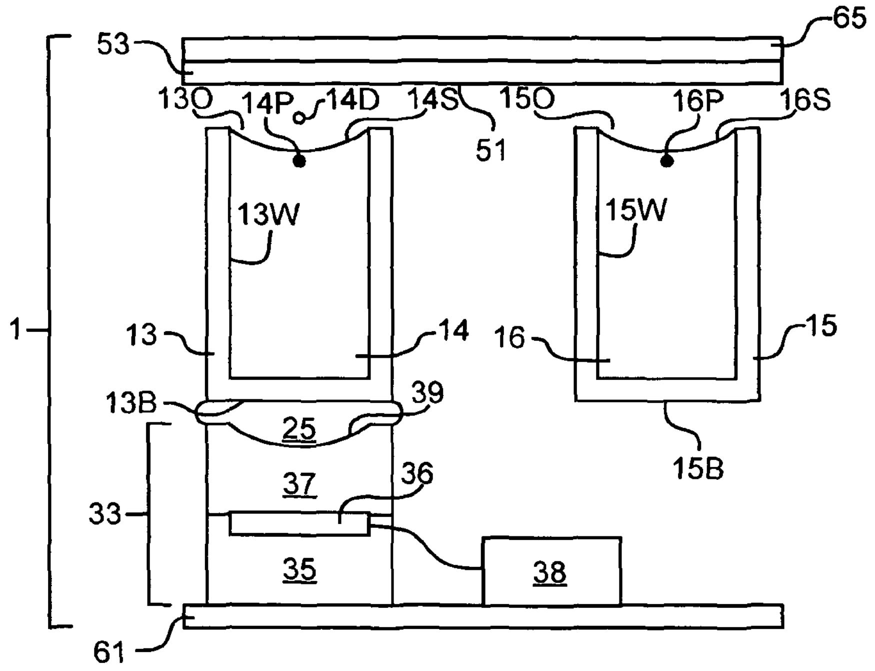
FIGS. 5A and 5B, collectively referred to as FIG. 5, depicts in simplified cross-sectional view an exemplary embodiment of the inventive device that allows both the acoustic assessment of the contents of a plurality of reservoirs, each having a high height-to-diameter ratio, and the ejection of fluid droplets from the reservoirs. As depicted, the device comprises first and second reservoirs, a combined acoustic analyzer and ejector, and an ejector positioning means.

Optimally, acoustic coupling is achieved between the ejector and each of the reservoirs through indirect contact, as illustrated in FIG. 5A. In this figure, an acoustic coupling medium 25 is placed between the ejector 33 and the base 13B of reservoir 13, with the ejector and reservoir located at a predetermined distance from each other. The acoustic coupling medium may be an acoustic coupling fluid, preferably an acoustically homogeneous material in conformal contact with both the acoustic focusing means 37 and each reservoir. In addition, it is important to ensure that the fluid medium is substantially free of material having different acoustic properties than the fluid medium itself. Furthermore, it is preferred that the acoustic coupling medium is comprised of a material having acoustic properties that facilitate the transmission of acoustic radiation without significant attenuation in acoustic pressure and intensity. Also, the acoustic impedance of the coupling medium should facilitate the transfer of energy from the coupling medium into the container. As shown, the first reservoir 13 is acoustically coupled to the acoustic focusing means 37, such that an acoustic wave is generated by the acoustic radiation generator and directed by the focusing means 37 into the acoustic coupling medium 25, which then transmits the acoustic radiation into the reservoir 13.

In operation, reservoirs 13 and 15 are each filled with first and second fluids 14 and 16, respectively, as shown in FIG. 5. The acoustic ejector 33 is positionable by means of ejector positioning means 61, shown below reservoir 13, in order to achieve acoustic coupling between the ejector and the reservoir through acoustic coupling medium 25. Once the ejector, the reservoir, and the substrate are in proper alignment, the acoustic radiation generator 35 is activated to produce acoustic radiation that is directed toward a free fluid surface 14S of the first reservoir. The acoustic radiation will then travel in a generally upward direction toward the free fluid surface 14S. The acoustic radiation will be reflected under different circumstances. Typically, reflection will occur when there is a change in the acoustic property of the medium through which the acoustic radiation is transmitted. It has been observed that a portion of the acoustic radiation traveling upward will be reflected from by the reservoir bases 13B and 15B as well as the free surfaces 145 and 16S of the fluids contained in the reservoirs 13 and 15.

As discussed above, acoustic radiation may be employed for use as an analytical tool as well as to eject droplets from a reservoir. In an analytical mode, the acoustic radiation generator is typically activated so as to generate low energy acoustic radiation that is insufficiently energetic to eject a droplet from the fluid surface. This is typically done by using an extremely short pulse (on the order of tens of nanoseconds) relative to that required for droplet ejection (on the order of microseconds). By determining the time it takes for the acoustic radiation to be reflected by the fluid surface back to the acoustic radiation generator, and then correlating that time with the speed of sound in the fluid, the distance—and thus the fluid height—may be calculated. Of course, care must be taken in order to ensure that acoustic radiation reflected by the interface between the reservoir base and the fluid is accounted for and discounted so that acoustic assessment is based on the travel time of the acoustic radiation within the fluid only.

In order to form an array on a substrate using the inventive device, substrate 53 is positioned above and in proximity to the first reservoir 13 such that one surface of the substrate, shown in FIG. 5 as underside surface 51, faces the reservoir and is substantially parallel to the surface 14S of the fluid 14 therein. Once the ejector, the reservoir, and the substrate are in proper alignment, the acoustic radiation generator 35 is activated to produce acoustic radiation that is directed by the focusing means 37 to a focal point 14P near the fluid surface 14S of the first reservoir. As shown, the focusing means having an F-number greater is needed. That is, an ejection acoustic wave having a focal point near the fluid surface is generated in order to eject at least one droplet of the fluid.

The optimum intensity and directionality of the ejection acoustic wave and its frequency ranges are determined using the aforementioned analysis, optionally in combination with additional data. That is, any of the conventional or modified sonar techniques discussed above may be employed. The "optimum" intensity and directionality are generally selected to produce droplets of consistent size and velocity. For example, the desired intensity and directionality of the ejection acoustic wave may be determined by using the data from the above-described assessment relating to reservoir volume or fluid property data, as well as geometric data associated with the reservoir. In addition, the data may show the need to reposition the ejector so as to reposition the acoustic radiation generator with respect to the fluid surface, in order to ensure that the focal point of the ejection acoustic wave is near the fluid surface, where desired. For example, if analysis reveals that the acoustic radiation generator is positioned such that the ejection acoustic wave cannot be focused near the fluid surface, the acoustic radiation generator is repositioned using vertical, horizontal, and/or rotational movement to allow appropriate focusing of the ejection acoustic wave.

As a result, droplet 14D is ejected from the fluid surface 14S onto a designated site on the underside surface 51 of the substrate. The ejected droplet may be retained on the substrate surface by solidifying thereon after contact; in such an embodiment, it may be necessary to maintain the substrate at a low temperature, i.e., a temperature that results in droplet solidification after contact. Alternatively, or in addition, a molecular moiety within the droplet attaches to the substrate surface after contract, through adsorption, physical immobilization, or covalent binding.

Figure 5B:
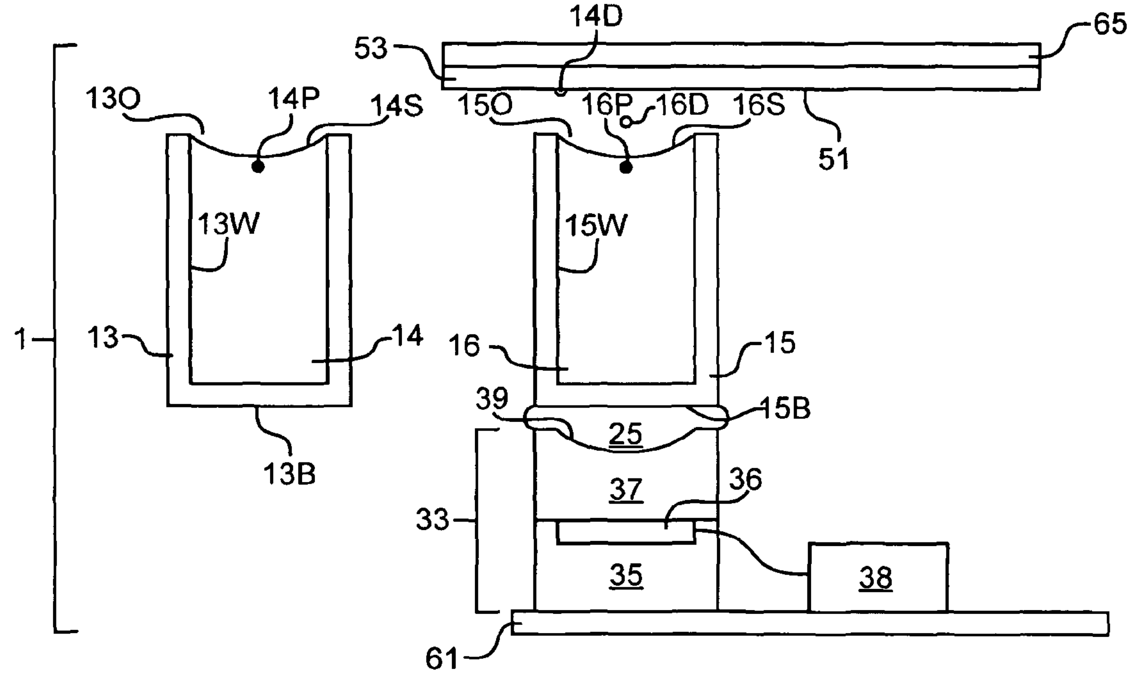

Then, as shown in FIG. 5B, a substrate positioning means 65 repositions the substrate 53 over reservoir 15 in order to receive a droplet therefrom at a second designated site. FIG. 5B also shows that the ejector 33 has been repositioned by the ejector positioning means 61 below reservoir 15 and in acoustically coupled relationship thereto by virtue of acoustic coupling medium 25. Once properly aligned, the acoustic radiation generator 35 of ejector 33 is activated to produce low energy acoustic radiation to assess the contents of the reservoir 15 and to determine whether and/or how to eject fluid from the reservoir. Historical droplet ejection data associated with the ejection sequence may be employed as well. Again, there may be a need to reposition the ejector so as to reposition the acoustic radiation generator with respect to the fluid surface, in order to ensure that the focal point of the ejection acoustic wave and its frequency ranges is near the fluid surface, where desired. Should the results of the assessment indicate that fluid may be dispensed from the reservoir, focusing means 37 is employed to direct higher energy acoustic radiation to a focal point 16P within fluid 16 near the fluid surface 16S, thereby ejecting droplet 16D onto the substrate 53.

It will be appreciated that various components of the device may require individual control or synchronization to form an array on a substrate. For example, the ejector positioning means may be adapted to eject droplets from each reservoir in a predetermined sequence associated with an array to be prepared on a substrate surface. Similarly, the substrate positioning means for positioning the substrate surface with respect to the ejector may be adapted to position the substrate surface to receive droplets in a pattern or array thereon. Either or both positioning means, i.e., the ejector positioning means and the substrate positioning means, may be constructed from, for example, motors, levers, pulleys, gears, a combination thereof, or other electromechanical or mechanical means known to one of ordinary skill in the art. It is preferable to ensure that there is a correspondence between the movement of the substrate, the movement of the ejector, and the activation of the ejector to ensure proper array formation.

Figure 6A:
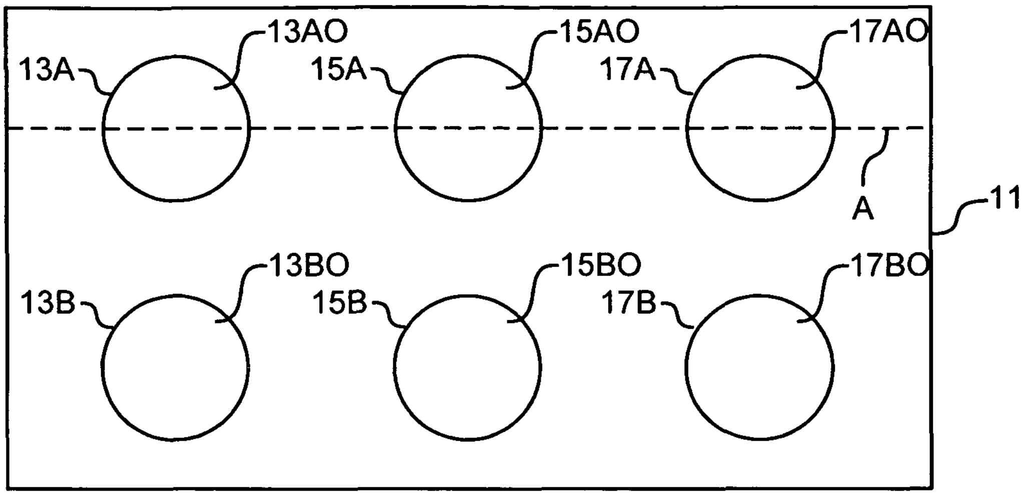
FIGS. 6A-6C, collectively referred to as FIG. 6, schematically illustrate a rectilinear array of reservoirs in the form of a well plate having three rows and two columns of wells each having a low height-to-diameter ratio.
Figure 6B:
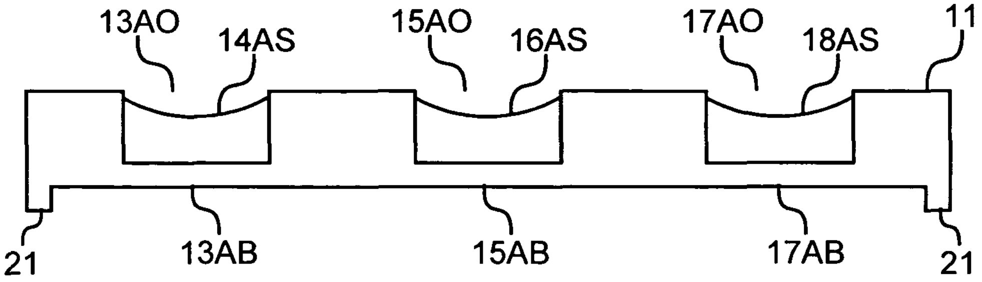
Figure 6C:
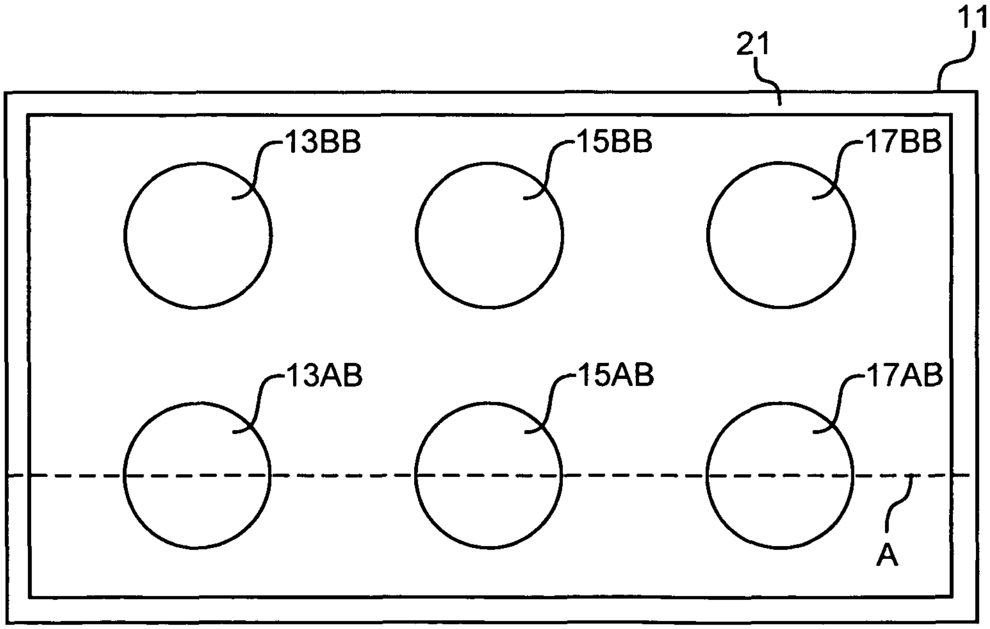

FIG. 6 schematically illustrates an exemplary rectilinear array of reservoirs that may be used with the invention. The reservoir array is provided in the form of a well plate 11 having three rows and two columns of wells. As depicted in FIGS. 6A and 6C, wells of the first, second, and third rows of wells are indicated at 13A and 13B, 15A and 15B, and 17A and 17B, respectively. Each is adapted to contain a fluid having a fluid surface. As depicted in FIG. 6B, for example, reservoirs 13A, 15A, and 17A contain fluids 14A, 16A, and 18A, respectively. The fluid surfaces for each fluid are indicated at 14AS, 16AS, and 18AS. As shown, the reservoirs have a height-to diameter-ratio less than one and are of substantially identical construction so as to be substantially acoustically indistinguishable, but identical construction is not a requirement. Each of the depicted reservoirs is axially symmetric, having vertical walls extending upward from circular reservoir bases indicated at 13AB, 13BB, 15AB, 15BB, 17AB, and 17BB, and terminating at corresponding openings indicated at 13AO, 13BO, 15AO, 15BO, 17AO, and 17BO. The bases of the reservoirs form a common exterior lower surface 19 that is substantially planar. Although a full well plate skirt (not shown) may be employed that extends from all edges of the lower well plate surface, as depicted, partial well plate skirt 21 extends downwardly from the longer opposing edges of the lower surface 19. The material and thickness of the reservoir bases are such that acoustic radiation may be transmitted therethrough and into the fluid contained within the reservoirs.

In short, the invention provides improved devices and methods for ejecting one or more droplets from a reservoir of fluid, through the use previously unknown forms of focused acoustic radiation. Such forms may include a plurality of frequency ranges, regardless whether they are simultaneous, nonsimultaneous, discrete, or nondiscrete. While previously known forms of acoustic radiation are expressly excluded from the invention, e.g., a linear acoustic sweep, dual simultaneous frequencies, broadband frequencies, and random, the invention may include modifications of such forms, particularly when modifications result in acoustic radiation having a plurality of nonsimultaneous and/or discrete frequency ranges.

Variations of the present invention will be apparent to those of ordinary skill in the art. For example, while FIG. 5 depicts the inventive device in operation to form a biomolecular array bound to a substrate, the device may be operated in a similar manner to format a plurality of fluids. Such formatting may involve the transfer of fluids from odd-sized bulk containers to wells of a standardized well plate, or the transfer of fluids from a source well plate to a target well plate. Often well plate to well plate transfer involves use of well plates having different number of wells and/or wells plate having wells of different sizes.

It is to be understood that while the invention has been described in conjunction with the preferred specific embodiments thereof, the foregoing description is intended to illustrate and not limit the scope of the invention. Other aspects, advantages and modifications will be apparent to those skilled in the art to which the invention pertains. All patents, patent applications, journal articles and other references cited herein are incorporated by reference in their entireties.

We claim:

1. A method for ejecting a droplet from a reservoir of fluid, comprising:

applying a first toneburst comprising a first frequency range to a reservoir comprising a fluid during a first time period, the first toneburst configured to:

generate an elongated transient feature of fluid extending away from the fluid surface;

applying a second toneburst to the reservoir during a second time period after the first time period, the second toneburst comprising a second frequency range including at least one overlapping frequency with the first frequency range, the second toneburst configured to:

transform an upper portion of the elongated transient feature into a leading lobe, form a trailing lobe with the base of the elongated transient feature, break off the leading lobe to form a droplet, and recapture the trailing lobe into the fluid surface.

2. The method of claim 1, wherein the first and second tonebursts are generated by a single transducer.

3. The method of claim 1, wherein the first frequency range includes at least one frequency that does not overlap with the second frequency range.

4. The method of claim 3, wherein the second frequency range is an integer multiple of the first frequency range.

5. The method of claim 3, wherein a toneburst generator alternates between producing the first and second frequency ranges.

6. The method of claim 5, wherein the first and second frequency ranges are repeatedly produced by the toneburst generator.

7. The method of claim 3, wherein the first and second frequency ranges are separated by a period during which no toneburst is produced that substantially determines the volume and/or velocity of the ejected droplet.

8. The method of claim 7, wherein the first and second frequency ranges are separated by the period during which no toneburst is produced.

9. The method of claim 1, wherein at least one frequency range is comprised of a range of frequencies.

10. The method of claim 9, wherein each frequency range is comprised of a different range of frequencies.

11. The method of claim 9, wherein the at least one frequency range is comprised of a sweep through the range of frequencies.

12. The method of claim 10, wherein each frequency range is comprised of a sweep through a different range of frequencies.

13. The method of claim 1, wherein the droplet has a first volume that is greater than a second volume of an alternative droplet ejected using only the first toneburst.

14. The method of claim 13, wherein the first volume of the droplet is at least 100% greater than the second volume of the alternative droplet ejected using only the first toneburst.

15. The method of claim 13, wherein the droplet has a first velocity that is higher than a second velocity of the alternative droplet ejected using only the first toneburst.

16. The method of claim 15, wherein the first velocity of the droplet is at least 10% higher than the second velocity of the alternative droplet ejected using only the first toneburst.

17. The method of claim 1, wherein the tonebursts are transmitted through a coupling medium before its application to the reservoir.

18. The method of claim 1, wherein first and second tonebursts repeatedly applied to the fluid in the reservoir so as to eject a plurality of droplets there from.

19. The method of claim 18, wherein each ejected droplet has substantially the same volume.

20. The method of claim 19, wherein the droplets are ejected at a rate faster than that possible using only the first toneburst.

21. The method of claim 20, wherein the droplets are ejected at a rate at least 10% faster than that possible using only the first toneburst.

22. The method of claim 1, wherein the droplet is deposited on a substrate.

23. The method of claim 1, further comprising applying the first and second tonebursts to a different reservoir containing a fluid in a manner effective to eject a droplet there from.

24. The method of claim 23, wherein the reservoirs are acoustically indistinguishable.

25. The method of claim 23, wherein each reservoir and fluid contained therein is insensitive to resonance absorption of the applied tonebursts.

26. The method of claim 1, the fluid in the reservoir is interrogated before the first and second tonebursts are applied.

27. The method of claim 1, further comprising applying the first and second tonebursts via focusing means associated with an F-number of at least 2.

28. The method of claim 1, further comprising applying the first and second tonebursts via focusing means associated with an F-number of at least 3.

29. The method of claim 1, wherein the power applied in the first toneburst is sufficient to produce a secondary droplet.

30. A method for ejecting a droplet from a reservoir of fluid, comprising:

applying a first toneburst comprising a first frequency range to a reservoir comprising a fluid during a first time period, the first toneburst configured to:

generate an elongated transient feature of fluid extending away from the fluid surface;

applying a second toneburst to the reservoir during a second time period after the first time period, the second toneburst comprising a second frequency range including at least one overlapping frequency with the first frequency range, the second toneburst configured to:

transform an upper portion of the elongated transient feature into a leading lobe, form a trailing lobe with the base of the elongated transient feature, merge the leading and trailing lobes into a droplet, and break off the droplet from the fluid in the reservoir.

31. The method of claim 30, wherein the first and second tonebursts are repeatedly applied to the fluid in the reservoir so as to eject a plurality of droplets therefrom.

32. The method of claim 30, further comprising:

repeatedly applying the first and second tonebursts, wherein the repeated application of the first and second tonebursts ejects the droplet at a rate at least two times faster than a rate of ejection of an alternative droplet ejected with a single toneburst.

33. The method of claim 32, wherein the repeated application of the first and second tonebursts ejects the droplet at a rate at least four times faster than the rate of ejection of the alternative droplet ejected with a single toneburst.

34. The method of claim 32, wherein the repeated application of the first and second tonebursts ejects the droplet at a rate at least ten times faster than the rate of ejection of the alternative droplet ejected with a single toneburst.

35. A method for ejecting a droplet, comprising:

applying a first toneburst comprising a first frequency range to a reservoir comprising a fluid during a first time period, the first toneburst sufficient to generate an elongated transient feature of fluid extending away from the fluid surface, wherein the feature has sufficient momentum to form a droplet of a nominal volume and a nominal velocity for ejection from the reservoir; and applying a second toneburst to the fluid during a second time period after the first time period, the second toneburst being a next toneburst to occur after the first toneburst, the second toneburst discontinuous in frequency from the first toneburst, the second toneburst sufficient to modify the momentum of the feature so that the droplet is ejected having an actual volume that differs from the nominal volume and an actual velocity that differs from the nominal velocity.

36. The method of claim 35, wherein the first toneburst has a first characteristic frequency that differs from a second characteristic frequency of the second toneburst.

37. The method of claim 35, wherein the actual volume is greater than the nominal volume.

38. The method of claim 35, wherein the actual volume is less than the nominal volume.

39. The method of claim 35, wherein the actual velocity is greater than the nominal velocity.

40. The method of claim 35, wherein the actual velocity is lower than the nominal velocity.

41. The method of claim 35, wherein the actual and nominal velocities have different directionalities.

42. A method for ejecting a droplet from a reservoir of fluid, comprising:

applying a first toneburst comprising a first frequency range to a reservoir comprising a fluid during a first time period, the first toneburst sufficient to generate a first portion of a droplet extending away from the fluid surface;

applying a second toneburst to the fluid during a second time period after the first time period, the second toneburst comprising a second frequency range including at least one overlapping frequency with the first frequency range, the second toneburst sufficient to generate a second portion of the droplet, and break off the droplet from the fluid in the reservoir.

43. The method of claim 42 wherein the first and second frequency ranges overlap at least in part.

44. The method of claim 42 wherein there is a time gap between the first toneburst and the second toneburst.

45. The method of claim 42 wherein there is no time gap between the first toneburst and the second toneburst.

46. A method for ejecting a droplet from a reservoir of fluid, comprising:

applying a first toneburst to a reservoir comprising a fluid during a first time period, the first toneburst configured to generate an elongated transient feature of fluid extending away from the fluid surface; and applying a second toneburst to the reservoir during a second time period which is a nonzero amount of time after the first time period, the second toneburst configured to eject a droplet from the elongated transient feature and further configured to suppress satellite fluid ejection from the fluid surface.

47. A method for ejecting a droplet from a reservoir of fluid, comprising:

applying a toneburst to a reservoir comprising a fluid and having an elongated transient feature of fluid extending away from the fluid surface, the toneburst configured to separate a first portion of the elongated transient feature from a remainder of the elongated transient feature so as to prevent the remainder of the elongated transient feature from forming a satellite droplet.

48. A method for ejecting a droplet from a reservoir of fluid, comprising:

applying a toneburst to a reservoir comprising a fluid and having an elongated transient feature of fluid extending away from the fluid surface, the toneburst configured to prevent satellite fluid ejection from the elongated transient feature.

49. The method of claim 48, wherein satellite fluid ejection is suppressed via a secondary push mechanism.

50. The method of claim 48, wherein satellite fluid ejection is suppressed via an active recapture mechanism.

51. The method of claim 48, wherein the fluid comprises an aqueous solution.

52. The method of claim 48, wherein the fluid comprises a biological sample.

53. The method of claim 48, wherein the fluid comprises biomolecules.

54. The method of claim 48, wherein the reservoir comprises a well in a well plate.

55. The method of claim 48, wherein the reservoir is configured to eject the droplet toward a substrate.

56. The method of claim 55, wherein the substrate comprises a biomolecular array.

57. The method of claim 55, wherein the substrate comprises a well plate.

58. The method of claim 48, wherein the elongated transient feature comprises a trailing lobe formed by separation of a primary droplet from the fluid.

59. A method for ejecting a droplet from a reservoir of fluid, comprising:

applying a first toneburst to a reservoir comprising a fluid, the first toneburst configured to generate an elongated transient feature of fluid extending away from the fluid surface; and applying a second toneburst to the reservoir, the second toneburst configured to stabilize a necking region in the elongated transient feature.

60. A method for ejecting a droplet from a reservoir of fluid, comprising:

applying a first toneburst to a reservoir comprising a fluid, the first toneburst configured to generate an elongated transient feature of fluid extending away from the fluid surface; and applying a second toneburst to the reservoir, the second toneburst configured to generate a break between a single droplet and a remainder of the elongated transient feature, so as to prevent the formation of a satellite droplet.

61. A method of ejecting a droplet from a reservoir of fluid, comprising:

ejecting a primary droplet from a fluid reservoir at a power that is sufficiently high to create a satellite droplet; and suppressing the formation of the satellite droplet, while ejecting the primary droplet.

62. The method of claim 61, wherein a plurality of primary droplets are ejected at the power and at a predetermined rate, the predetermined rate is at least 10 droplet ejections per second.

63. The method of claim 61, wherein a plurality of primary droplets are ejected at the power and at a predetermined rate, the predetermined rate is at least 100 droplet ejections per second.

64. The method of claim 61, wherein a plurality of primary droplets are ejected at the power and at a predetermined rate, the predetermined rate is at least 1000 droplets ejections per second.

65. The method of claim 61, wherein a plurality of primary droplets are ejected at the power and at a predetermined rate of at least two times faster than a rate of ejection of an alternative droplet ejected with a single toneburst.

66. The method of claim 61, wherein a plurality of primary droplets are ejected at the power and at a predetermined rate of at least four times faster than a rate of ejection of an alternative droplet ejected with a single toneburst.

67. The method of claim 61, wherein a plurality of primary droplets are ejected at the power and at a predetermined rate of at least ten times faster than a rate of ejection of an alternative droplet ejected with a single toneburst.

68. A method of ejecting a droplet from a reservoir of fluid, comprising:

applying a first toneburst to a fluid contained in a reservoir of fluid, the first toneburst being sufficient to create a droplet and a satellite droplet; and suppressing the formation of the satellite droplet via a second toneburst.

69. A method of ejecting a droplet from a reservoir of fluid, comprising:

applying a toneburst to a fluid contained in a reservoir of fluid sufficient to create a transient surface feature of the fluid; and ejecting a droplet from the transient feature while actively suppressing the formation of a satellite droplet that would form without the active suppression.

70. The method of claim 69 wherein actively suppressing the formation of the satellite droplet comprises applying a plurality of additional tonebursts.

71. A method of ejecting a droplet from a reservoir of fluid, the method comprising:

suppressing satellite droplet creation from a toneburst sufficient to create a satellite droplet by merging a trailing lobe of a transient feature created by the toneburst with a leading lobe of the transient feature, where the trailing lobe of the transient feature would otherwise form the satellite droplet without the merge.

72. A method of ejecting a droplet from a reservoir of fluid, the method comprising:

suppressing satellite droplet creation from a toneburst sufficient to create a satellite droplet by limiting necking below a trailing lobe of a transient feature created by the toneburst, where necking below the trailing lobe would otherwise produce the satellite droplet.

73. A method for ejecting a droplet from a reservoir of fluid, comprising:

applying a first toneburst comprising a first frequency range to a reservoir comprising a fluid during a first time period, the first toneburst configured to:

generate an elongated transient feature of fluid extending away from the fluid surface; and applying a second toneburst to the reservoir during a second time period after the first time period, the second toneburst configured to:

transform an upper portion of the elongated transient feature into a leading lobe, form a trailing lobe with the base of the elongated transient feature, break off the leading lobe to form a droplet, and recapture the trailing lobe into the fluid surface.

74. A method for ejecting a droplet from a reservoir, the method comprising:

applying a toneburst to an elongated transient feature of fluid extending away from a fluid surface of the reservoir, the toneburst configured to:

transform an upper portion of the elongated transient fluid feature extending from the reservoir into a leading lobe, form a trailing lobe with the base of the elongated transient feature, and break off the leading lobe to form a droplet, and recapturing the trailing lobe into the fluid surface by the toneburst.

75. The method of claim 74, further comprising:

stabilizing a necking region in the transient feature by the toneburst.

76. A method for ejecting a droplet from a reservoir, the method comprising:

applying a toneburst to an elongated transient feature of fluid extending away from a fluid surface of the reservoir, the toneburst configured to:

transform an upper portion of the elongated transient fluid feature extending from the reservoir into a leading lobe, form a trailing lobe with the base of the elongated transient feature, and break off the leading lobe to form a droplet, and suppressing satellite droplet formation from the transient feature by the toneburst.

77. The method of claim 76, further comprising:

stabilizing a necking region in the transient feature by the toneburst.

78. A method of ejecting a droplet from a reservoir of fluid, comprising:

ejecting a primary droplet from the reservoir at a power that is sufficiently high to create a satellite droplet; and applying a suppressive toneburst to the fluid reservoir such that a satellite droplet volume is reduced.

79. The method of claim 78, wherein the suppressive toneburst is applied to a necking region formed during ejection of the primary droplet.

80. A method of ejecting a droplet from a reservoir of fluid, comprising:

applying a toneburst to an elongated transient feature of fluid extending away from a fluid surface of the reservoir, the toneburst configured to reduce a satellite droplet volume of a satellite droplet formed from the elongated transient feature.

81. A method for ejecting a droplet from a reservoir, the method comprising:

applying a toneburst to an elongated transient feature of fluid extending away from a fluid surface of the reservoir, the toneburst configured to:

transform an upper portion of the elongated transient fluid feature extending from the reservoir into a leading lobe, form a trailing lobe with the base of the elongated transient feature, and break off the leading lobe to form a primary droplet and a secondary droplet, and applying a suppressive toneburst to the reservoir to reduce a volume of the secondary droplet.

* * * * *